J. P. GERAGHTY.
SUBMARINE DETECTOR OR TELLTALE.
APPLICATION FILED AUG. 10, 1917.

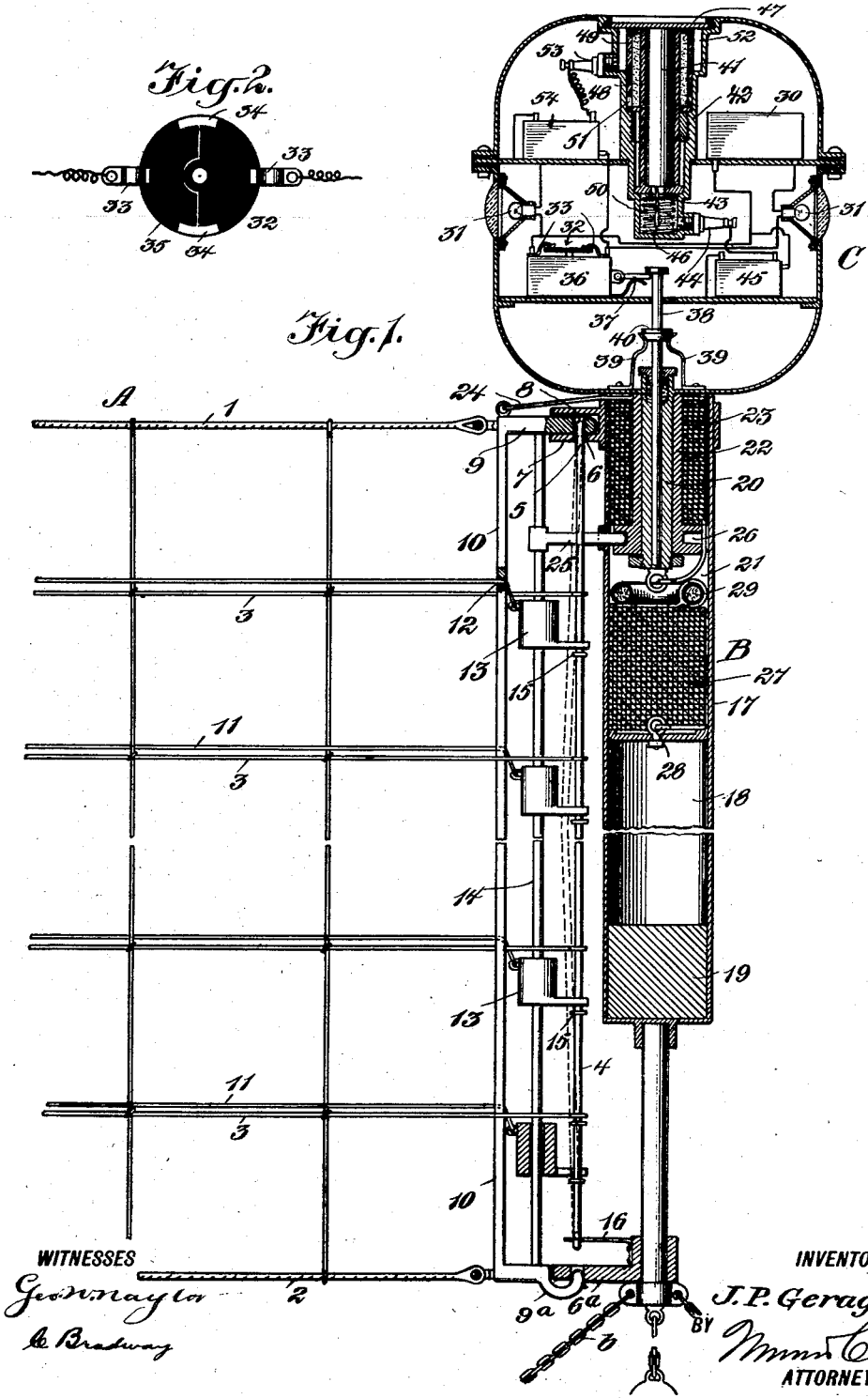

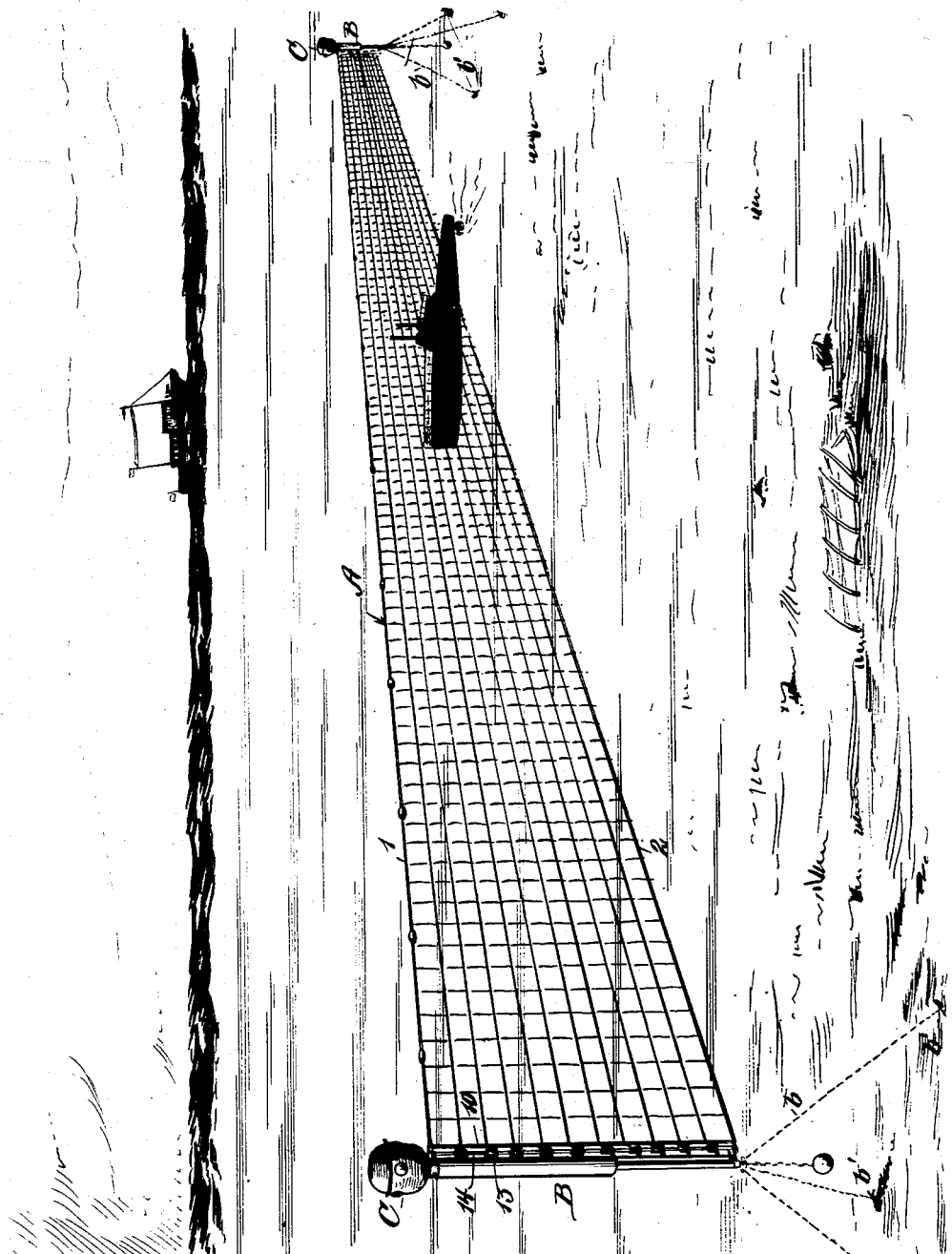

1,292,755.

Patented Jan. 28, 1919.
3 SHEETS—SHEET 3.

WITNESSES

INVENTOR
J. P. Geraghty.
BY
ATTORNEYS

UNITED STATES PATENT OFFICE.

JOHN P. GERAGHTY, OF JERSEY CITY, NEW JERSEY.

SUBMARINE DETECTOR OR TELLTALE.

1,292,755.  Specification of Letters Patent.  Patented Jan. 28, 1919.

Application filed August 10, 1917. Serial No. 185,525.

*To all whom it may concern:*

Be it known that I, JOHN P. GERAGHTY, a citizen of the United States, and a resident of Jersey City, in the county of Hudson and State of New Jersey, have invented a new and Improved Submarine Detector or Telltale, of which the following is a full, clear, and exact description.

This invention relates to a system of detecting submarines by the use of nets which have telltale or signal means that become operative when the submarine strikes or becomes ensnared in the net.

The invention has for its general objects to provide a comparatively simple and reliable submarine detecting system which is comparatively simple and inexpensive to manufacture and place in position, and so designed that certain parts can be readily recovered after a submarine has been caught or detected by the device.

A more specific object of the invention is the provision of a novel form of net which is detachably fastened to anchoring devices so that when a submarine strikes a net it can tear the latter away from the anchoring devices, which then cause signals or telltale means to become operative so that patrol boats can locate the position of the submarine that has engaged the net, the signaling means enabling the submarine to be detected for many miles away.

With such objects in view, and others which will appear as the description proceeds, the invention comprises various novel features of construction and arrangement of parts which will be set forth with particularity in the following description and claims appended hereto.

In the accompanying drawings, which illustrate certain embodiments of the invention and wherein similar characters of reference indicate corresponding parts in all the views, Figure 1 is an elevational and sectional view showing one end of a net with the anchoring means therefor and signaling devices carried by the anchoring means;

Fig. 2 is a plan view of the clock switch in the electric circuits which control the signal or telltale devices;

Fig. 3 is a perspective view showing a net anchored in a body of water and a submarine about to engage the net;

Figure 4:
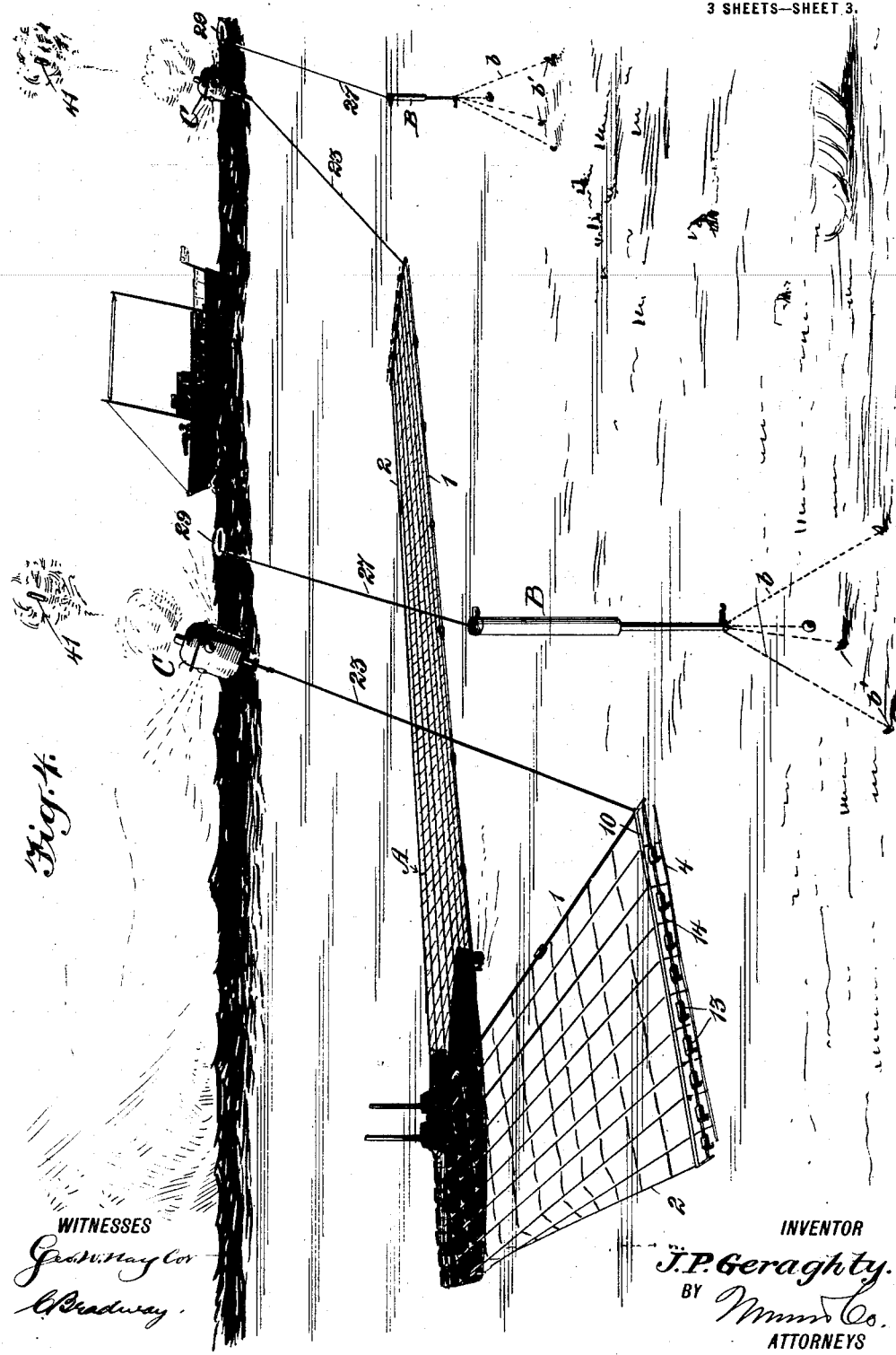
Fig. 4 is a similar view showing the net turned away from its anchorage and carried by the submarine, and the signal devices in operation.

Referring to the drawing, A designates a net which is stretched in a vertical plane and supported at its ends on anchoring devices B, the net being composed of upper and lower cables 1 and 2 which are heavy enough to give the required strength, and the rest of the net is made of lighter material. The horizontal ropes 3 of the net are connected at each end with a vertically disposed flexible rod 4, the upper end of which forms a bolt 5 that passes through an opening 6 in a bracket 7 and engages in an opening 8 in the lug 9 carried by the upper end of the end bar 10 of the net. When a pull is exerted on the net, due to a submarine striking the same, the pull on the ropes or cables 3 will bow the rod 4 and draw the upper end out of engagement with the ear or member 9, whereby the net becomes detached from the anchoring device B, which carries the bracket 6. The device B also carries a lower bracket 6$^a$ into which engages a hook 9$^a$ on the lower end of the end bar 10, and consequently when the member or lug 9 becomes detached the hook will drop out of engagement with the bracket 6$^a$. The net also includes horizontal ropes or cables 11, the ends of which slidably pass through openings 12 in the end bars 10 and support weights 13 slidable on a vertical bar 14 carried by the lugs 9 and 9$^a$. On the bolt rod 4 are stops 15 with which the weights engage when they drop, so that the upper end of the bolt bar 4 will become disengaged from the member 9, so that the net will be released from the anchoring device B. The bolt rod 4 is yieldingly supported by a spring 16 which permits the said rod to yield downwardly when any or all the weights come into play, which happens if any cable 11 should be broken by contact with a submarine.

The anchoring devices B at each end of the net each comprises a buoy in the form of a cylindrical body or tube 17 containing an air chamber 18 and ballast 19 at its bottom. The lower end of the tube is connected with a plurality of chains or flexible elements $b$ having weights or anchors $b'$ at the bottom, the chains being of such length as to support the buoys at the level usually traveled by submarines. It is to be understood that a series of nets can be arranged at various levels so as to form an effective barrier wherever required. The buoys 17 maintain the net in a vertical position, and when the net becomes detached therefrom the buoys 17 remain in place and can be again located for attaching another net thereto.

Each buoy 17 carries at its upper end a float C which has a depending stem 20 extending into a chamber 21 in the upper end of the buoy 17, and on this stem is a spool 22 carrying a cable 23 which is connected at 24 with the associated end of the net A. The float C is adapted to be released when the submarine strikes the net. For this purpose the rod 14 has a catch 25 which extends into the chamber 21 and engages in an annular groove 26 in the bottom of the spool. When the net pulls away from the anchoring devices B the catches 25 disengage the spools 22, so that the floats C will be free to rise to the surface of the water. In doing so the cable 23 will unwind and the floats will serve to indicate that the net has been torn away from its anchorage and the submarine is enmeshed therewith. In the same chamber 21 in the top of the buoy 17 is another cable 27 which is fastened at 28 and has a small float 29, which, when the float C is free, rises to the surface of the water so that the anchoring devices B can be readily located for the purpose of attaching a new net thereto.

In order to detect a net when enmeshed with a submarine during the night, the float devices C have suitable illuminating means which can be set into operation by electric current. In the float C is a source of current 30 which is connected in circuit with lamps 31 that are adapted to be illuminated when the circuit is closed. This closing is effected by a switch 32 composed of contact brushes 33 and contact segments 34 which are electrically connected and mounted on a disk 35, the said disk being turned from open to closed circuit position by a clock mechanism 36. This mechanism is held by a brake lever 37 that is actuated by a pull pin 38 passing downwardly through the stem 20 and having its lower end connected with the cable 23, so that when the latter is fully unwound the pull on the cable will draw the pin 38 downwardly in opposition to the springs 39 that engage the button 40 on the pin 38. At the same time the circuit is closed through the lamps an aerial bomb or rocket 41 is projected into the air, as shown in Fig. 4, this bomb being arranged in a barrel 42 which contains at its lower end a charge of explosive 43 that is ignited by a spark plug 44 connected in the electric circuit by a coil 45. The bomb 41 has a fuse 46 which will cause the bomb to be exploded when it reaches a certain height, the igniting of the bomb being effected by the explosive 43 when ignited. A plate 47 is sealed in the top of the float C by suitable waterproof material which readily permits the plate to be thrown out when the bomb is projected. A red light may be produced at the floats C when the bomb is projected. For this purpose a charge of red light or other signal powder 48 is arranged in a chamber 49 carried by the cylinder 42, which latter is moved upwardly by a spring 50 after the explosion of the explosive 43 takes place. The wall of the chamber 48 has ports 51 through which powder passes outwardly into an outer chamber 52, wherein the powder is ignited by a spark plug 53 that is connected in an electric circuit through a coil 54. It will thus be seen that the illuminated bombs and the red light powder form two effective means for attracting the attention of submarine chasers or other naval boats, and if the red light burns out before the floats C are reached the small lamps 31 will continue to burn for hours so that they can be easily discovered.

From the foregoing description taken in connection with the accompanying drawing, the advantages of the construction and method of operation will be readily understood by those skilled in the art to which the invention appertains, and while I have described the principle of operation, together with the system which I now consider to be the best embodiment thereof, I desire to have it understood that the system shown is merely illustrative and that such changes may be made when desired as fall within the scope of the appended claims.

Having thus described my invention, I claim as new and desire to secure by Letters Patent:

1. The combination of a net for submarines, anchoring devices, means on the ends of the net for detachably connecting the latter with the said devices and for automatically detaching the net when a pull is produced thereon by a submarine, and additional means for detaching the net from the said devices in case the net is broken or cut by a submarine.

2. The combination of a net, anchoring devices for the ends of the net, and a flexible bolt bar detachably connecting the net with the said devices, said bar being connected with the net, whereby a pull thereon flexes the bar out of holding or locking position.

3. The combination of a net, anchoring devices for the ends of the net, a flexible bolt bar detachably connecting the net with the said devices, said bar being connected with the net, whereby a pull thereon flexes the bar out of holding or locking position, said net having longitudinal cables, weights attached to the ends of the cables, and means for permitting the weights to move the bolt bar out of holding position when one or more of said cables are cut or broken.

4. The combination of a net, anchoring devices to which the ends of the net are detachably connected, a float detachably connected with each device, a cable connecting each float with the net, electrically-controlled signaling means on each float, and a switch for the said means actuated by the pull on the cable when the latter is taut.

5. The combination of a net, anchoring devices to which the net is detachably connected, a float carried by each device, means for releasing the floats at the same time the net is detached from the devices, cables connected with the net, movable members mounted on the floats and connected with the cables and adapted to be pulled as the floats are dragged on the surface of the water by the submarine-carried net, electrical means controlled by the said members, and signals set into use by the said electrical means.

6. The combination of a net, anchoring devices to which the net is detachably connected, a float carried by each device, means for releasing the floats at the same time the net is detached from the devices, cables connected with the net, movable members mounted on the floats and connected with the cables and adapted to be pulled as the floats are dragged on the surface of the water by the submarine-carried net, electrical means controlled by the said members, signals set into use by the said electrical means, floats carried by the said devices, and cables connecting the floats with the devices for permitting the devices to be located after the net has become detached.

7. The combination of a net, anchoring devices to which the net is detachably connected, floats connected with the net for indicating the location thereof when the net is detached, and means in the floats for projecting signal bombs into the air when the floats are at the surface of the water.

8. The combination of a net, anchoring devices to which the net is detachably connected, floats connected with the net for indicating the location thereof when the net is detached, means in the floats for projecting signal bombs into the air when the floats are at the surface of the water, and electric lights in the floats to indicate the position of the latter.

9. The combination of a net, anchoring devices to which the net is detachably connected, floats connected with the net for indicating the location thereof when the net is detached, means in the floats for projecting signal bombs into the air when the floats are at the surface of the water, electric lights in the floats to indicate the position of the latter, and means for burning an illuminating powder in the floats after the bombs have been projected.

JOHN P. GERAGHTY.